Patented Oct. 4, 1938

2,132,074

UNITED STATES PATENT OFFICE 2,132,074

TREATMENT OF DIRECT DYESTUFFS

Valentin Kartaschoff and Fritz Aeschlimann, Basel, Switzerland, assignors to the firm Chemical Works formerly Sandoz, Basel, Switzerland No Drawing. Application October 22, 1935, Serial No. 46,211. In Switzerland November 1, 1934

5 Claims. (Cl. 8—74)

The present invention relates to a process for improving the fastness properties of direct dyestuffs on substrata or on textile fibres.

It has been found that by treating direct dyestuffs with nitrogen-containing condensation products from glycerine halogenhydrines and with the acylated, alkylated, arylated or aralkylated derivatives of the said condensation products, the fastness properties of the direct dyestuffs can greatly be improved.

Condensation products which can be used according to the present invention are the polyaminopolypropanols and their alkylated, aralkylated, arylated and acylated derivatives. These compounds may be prepared by reaction between glycerine dihalogenhydrines or epi-halogenhydrines and ammonia or primary or secondary organic bases, and are polymerization products with generally a high molecular weight, containing at least two radicals of the following configuration

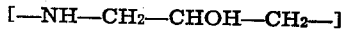
[—NH—CH₂—CHOH—CH₂—]

in which the hydrogen atom contained in the amino group can be substituted by aliphatic, araliphatic, aromatic or acyl groups. Such compounds have already been prepared by Claus (Annalen 168, p. 30), and have been described in French Pat. No. 771,836 and Swiss Pat. No. 170,085.

By treating the direct dyestuffs in solution or the textiles or substrata dyed therewith with the above cited condensation products, new water-insoluble or difficultly soluble addition products will be produced between the direct dyestuffs and the nitrogen-containing condensation products. Thus, the fastness of a dyeing for instance with a direct dyestuff will be improved in its properties, especially in respect of its fastness to water, to boiling, to perspiration, to acid boiling and acid cross-dyeing, to acid milling and wet-ironing, to washing, without in general the shade of the dyeing or its fastness to light being modified.

As the condensation products used in the present process often possess a certain affinity for cellulosic fibres, the improvement of the fastness of dyeing can be obtained by first mordanting the cellulosic fibre with the condensation product and thereon dyeing this fibre with a direct dyestuff.

The present process can also be used with great advantage in the printing industry, as it allows to use several dyestuffs, that could not have been used until now, because they possess a very bad fastness to water and flow on washing of the printings.

It is further possible to produce according to the present process water-fast dyeings on paper with such dyestuffs that are not fast to water, by impregnating the paper mass before or after the dyeing with the above cited condensation products.

Also in the lake industry the use of the products herein proposed presents great advantages as it becomes possible to prepare water-fast lakes.

One object of the present invention is, therefore, the use of nitrogenous condensation products obtainable from glycerine halogenhydrines and ammonia and of their derivatives, for the treatment of direct dyestuffs as such, or on textile fibres and substrata, whereby water-insoluble or difficultly soluble addition products between the direct dyestuffs and the nitrogenous condensation products become formed.

Another object of the present invention consists in the treatment of dyeings with direct dyestuffs with the nitrogenous condensation products of the above cited nature, whereby the fastness properties of the dyeings become improved.

Still another object of the present invention consists in the treatment of printings with direct dyestuffs with the nitrogenous condensation products of the above cited nature, whereby the fastness properties of the printings become improved.

Still another object of the present invention consists in the treatment of mixed fabrics containing cellulose fibres dyed or printed with direct dyestuffs, with the nitrogenous condensation products of the above cited nature, whereby the fastness properties of the dyed or printed cellulosic fibres will be improved.

Still another object of the present invention consists in the treatment of substrata and paper colored with direct dyestuffs, with the nitrogenous condensation products of the above cited nature, whereby the fastness properties of the lakes and paper become improved.

The following examples illustrate the present process and show the results that can be obtained, the parts being by weight:—

Example 1

100 parts of cotton yarn dyed in the usual way with 1 part of chloramine light red 7BL (Schultz, Farbstofftabellen, 7th edition, Supplemental Tome I, page 78) are immersed into a bath containing 10 parts of α-aminopropandiol, left therein for ¾ of an hour at 40° C., squeezed out and dried. The dyeing thus obtained possesses a much better fastness to water than the untreated one.

Example 2

100 parts of cotton yarn dyed with 2 parts of Chlorantine Light Blue 3GLL (Schultz, Farbstofftabellen, 7th edition, Supplemental Tome I, page 79) are immersed for half an hour into a bath containing 2.5 parts of a condensation product obtained by heating under pressure at 110–117° C., 210 parts of technical glycerine dichlorhydrine with 306 parts of an aqueous ammonia solution (25%). After drying the dyeing thus obtained becomes fast to water, to boiling water, to perspiration, to washing and to acid cross-dyeing.

Example 3

100 parts of cotton dyed with 2 parts of Chlorantine Light Green BLL (Schultz, Farbstofftabellen, 7th edition, Supplemental Tome I, page 79) are treated at 30° C. during half an hour with 5 parts of a condensation product obtained by heating under pressure at 105° C. a mixture of 120 parts of glycerine dichlorhydrine and 1000 parts of a 5% ethanol solution of ammonia.

By this treatment, the fastness to water, to boiling water, to washing and to acid cross-dyeing has been improved, without the shade or the fastness to light having been decreased.

Example 4

100 parts of cotton yarn dyed with 1 part of Chlorantine Light Red 5B (Schultz, Farbstofftabellen, 7th edition, Supplemental Tome I, page 79) are immersed at 20–25° C. during half an hour into a bath containing 2 parts of a condensation product obtained by heating under pressure at 115–135° C., 260 parts of glycerine dichlorhydrine with 225 parts of aqueous ammonia (25%). The thus treated dyeing has obtained a better fastness to water, washing and acid cross-dyeing.

Example 5

100 parts of cotton yarn dyed with 2 parts of chloramine pure blue A (Schultz, Farbstofftabellen, 7th edition, Tome 1, No. 513) are immersed at 20–30° C. during ½ hour into a bath containing 3 parts of a methylated product prepared from glycerine dichlorhydrine and ammonia. The dyed yarn thus treated can then be used as warp, as the direct dyestuff does no more tint the hot sizing bath.

Example 6

100 parts of a mixed fabric consisting of cotton and acetate silk and dyed with 3 parts of Chlorantine Light Red 6BLL (Schultz, Farbstofftabellen, 7th edition, Supplemental Tome I, page 79) are treated with 3 parts of a condensation product that has been prepared by condensing glycerine dichlorhydrine with ammonia and subjecting the product thus obtained to a subsequent condensation with glycerine monochlorhydrine.

By this treatment the fastness to water of the dyeing is so improved that by leaving the pieces still wet the acetate silk remains pure white, whereas in the untreated material the direct colour diffuses in the acetate silk and colours it to a certain extent.

Example 7

100 parts of white cotton yarn are immersed for one hour at 30° C. in a bath containing 2 parts of a dihydroxypropylated condensation product of glycerine dichlorhydrine with ammonia, and after washing dyed with 2 parts of chloramine pure blue A (Schultz, Farbstofftabellen, 7th edition, Tome I, No. 513). The dyeing thus obtained possesses an improved fastness to water and to acid cross-dyeing, as compared to the dyeing obtained on untreated cotton.

Example 8

100 parts of a mixed fabric consisting of cotton and viscose rayon is treated as described in Example 10 and dyed with 2 parts of chloramine pure blue FF (Schultz, Farbstofftabellen, 7th edition, Tome I, No. 510). In this manner a uniform dyeing with improved fastness properties is obtained, whereas without pretreatment the viscose rayon becomes deeper dyed than cotton and a non-uniform dyeing will be obtained.

Example 9

100 parts of cotton yarn dyed with 2 parts of chloramine pure blue A (Schultz, Farbstofftabellen, 7th edition, Tome I, No. 513) are treated with the condensation product prepared by condensing 92 parts of epichlorhydrine with 40 parts of a 28% aqueous solution of ammonia, whereby the fastness to acid cross-dyeing becomes improved. Such yarn can then be woven together with wool, whereby on cross-dyeing with acid dyestuffs pure double effects will be obtained.

Example 10

100 parts of cotton dyed with 2 parts of chloramine pure blue A (Schultz, Farbstofftabellen, 7th edition, Tome I, No. 513) are treated with 10 parts of a condensation product which has been prepared by first condensing glycerine dichlorhydrine with ammonia and thereon with the clorides of the cocoa nut acids. This treatment improves the fastness properties of the dyeing and imparts a soft feel to the material.

Example 11

100 parts of cotton dyed with chloramine pure blue A (Schultz, Farbstofftabellen, 7th edition, Tome I, No. 513) are treated with one part of a condensation product from glycerine dichlorhydrine and ammonia, which has been completely ethylated. The treated dyeing shows an improved fastness to water and to acid cross-dyeing. Instead of the above cited condensation product, one can use the respective water-soluble methylated or the methylated and acylated, e. g. with p-toluenesulphochloride, condensation products.

Example 12

To a printing paste consisting of 30 parts of chloramine red B (Schultz, Farbstofftabellen, 7th edition, Tome I, No. 377), 30 parts of tetracarnite, 40 parts of glycerine, 270 parts of water, 600 parts of British gum (1:1) and 30 parts of sodium phosphate there are added 30 parts of a condensation product from glycerine dichlorhydrine with ammonia and the printing paste thus obtained is used for printing on cotton or regenerated cellulose. After steaming for an hour, the prints can be washed in cold water without the dyestuff colouring the white ground.

Example 13

A piece of cotton printed in the usual way with Chloramine blue 2B (Schultz, Farbstofftabellen, 7th edition, Tome I, No. 385) is allowed to pass after steaming through a bath containing a 5 per cent aqueous solution of a condensation product from glycerine dichlorhydrine with ammonia and thereupon washed in order to eliminate the thickening. This washing operation can be carried out without any danger as the direct dyestuff has been rendered fast to water by the above treatment.

Instead of the condensation product hereinabove used, other condensation products can be employed.

Example 14

To a solution of 10 parts of Visco black (Schultz, Farbstofftabellen, 7th edition, Supplemental Tome I, page 144) in 500 parts of water there is added at 60–70° C. a solution of 10 parts of a condensation product obtained from glycerine dichlorhydrine and ammonia, whereby the dyestuff becomes completely precipitated. The black precipitate is then filtered, washed with water and dried. It can be used as a pigment in the lake industry.

If the precipitation is carried out in presence of a substratum generally used in the lake industry, a black lake fast to water will be obtained. In a similar manner other dyestuffs can be transformed into water-insoluble pigments.

Example 15

To 100 parts of a cold 1% aqueous solution of chloramine pure blue FF (Schultz, Farbstofftabellen, 7th edition, Tome I, No. 510) there is added 0.5 part of a condensation product obtained from glycerine dichlorhydrine and ammonia, and the solution thus obtained is used for dyeing paper by the so-called immersion process. The dyeing thus obtained is fast to water and does not colour even hot water.

By using instead of the above cited condensation product, suitable quantities of the products obtained from glycerine dichlorhydrine and monoethanolamine, or hexahydroaniline, or benzylamine, similar results in respect to the improvement of the water-fastness will be obtained.

Example 16

A piece of leather which has been coloured with dermacarbon (Schultz, Farbstofftabellen, 7th edition, Supplemental Tome I, page 85) by the so-called brush-process is treated with a 10% aqueous solution of a condensation product of glycerine dichlorhydrine with ammonia and dried. By this treatment the dyed leather has gotten a better fastness to water and to rubbing.

What we claim is:

1. A process for improving the fastness of dyeings with direct dyestuffs, comprising treating such dyeings with a water-soluble condensation product, involving the configuration $$[-NH-CH_2-CHOH-CH_2-]_x$$

wherein X represents a whole number greater than one.

2. A process for improving the fastness of dyeings with direct dyestuffs, comprising treating such dyeings with a water soluble condensation product selected from the group of condensation products involving the configuration $$[-NH-CH_2-CHOH-CH_2-]_x$$

wherein X represents a whole number greater than one, and acylated, alkylated, aralkylated and arylated derivatives of said condensation products.

3. A process for improving the fastness of dyeings with direct dyestuffs, comprising treating such dyeings with a water soluble condensation product involving the configuration $$[-NH-CH_2-CHOH-CH_2-]_x$$

wherein X represents a whole number greater than one, and prepared by interaction of one molecule of ammonia with one molecule of $\alpha, \gamma$-glycerine-dichlorhydrine, in presence of an acid binding agent.

4. A process for improving the fastness of dyeings with direct dyestuffs, comprising treating such dyeings with a water soluble condensation product involving the configuration $$[-NH-CH_2-CHOH-CH_2-]_x$$

wherein X represents a whole number greater than one, and prepared by interaction of one molecule of ammonia with one molecule of $\alpha, \gamma$-glycerine-dichlorhydrine, in presence of an excess of ammonia.

5. A process for improving the fastness of dyeings with direct dyestuffs, comprising treating such dyeings with an ethylated water-soluble condensation product prepared by ethylation of the condensation product involving the configuration $$[-NH-CH_2-CHOH-CH_2-]_x$$

wherein X represents a whole number greater than one and obtained by interaction of one molecule of ammonia with one molecule of $\alpha, \gamma$-glycerine-dichlorhydrine in presence of an excess of ammonia.

VALENTIN KARTASCHOFF.
FRITZ AESCHLIMANN.